US006617738B2

(12) United States Patent
Dickinson

(10) Patent No.: US 6,617,738 B2
(45) Date of Patent: Sep. 9, 2003

(54) ELECTRICAL POWER GENERATION SYSTEM UTILIZING AN ELECTRICALLY SUPERCONDUCTIVE COIL

(76) Inventor: Charles B Dickinson, 224 N. Beach Blvd., Bay St. Louis, MS (US) 39520

( * ) Notice: Subject to any disclaimer, the term of this patent is extended or adjusted under 35 U.S.C. 154(b) by 0 days.

(21) Appl. No.: 09/872,574

(22) Filed: Jun. 1, 2001

(65) Prior Publication Data

US 2002/0180283 A1 Dec. 5, 2002

(51) Int. Cl.[7] .......................... H02K 55/06; H02K 33/00
(52) U.S. Cl. .......................... 310/178; 310/52; 310/54; 310/63; 290/1 R; 505/160
(58) Field of Search ........................... 310/52, 54, 62, 310/63, 178, 168; 415/90; 290/2, 1 R, 43, 54, 44; 505/160

(56) References Cited

U.S. PATENT DOCUMENTS

| | | | | |
|---|---|---|---|---|
| 1,061,206 A | * | 5/1913 | Telsa | ........................... 415/90 |
| 3,443,134 A | | 5/1969 | Dowsett et al. | |
| 3,447,003 A | | 5/1969 | Cooper et al. | |
| 3,539,852 A | * | 11/1970 | Appleton et al. | ........... 310/178 |
| 3,944,865 A | | 3/1976 | Jewitt | |
| 4,058,747 A | | 11/1977 | Mailfert et al. | |
| 4,176,291 A | | 11/1979 | Rabinowitz | |

(List continued on next page.)

FOREIGN PATENT DOCUMENTS

| | | | | |
|---|---|---|---|---|
| EP | 653 829 | * | 5/1995 | .................. 310/178 |
| JP | 04-161056 | * | 6/1992 | .......... H02K/55/00 |

OTHER PUBLICATIONS

D. G. Shepherd; An Introduction to the Gas Turbine; 1949; p. 23–35 and title page and copyright page; D. Van Nostrand Company, Inc.; New York.

Erich Hausmann and Edgar P. Slack; Physics, Second Edition–Eleventh Printing; Apr. 1943; p. 224–225 and title page and copyright page; D. Van Nostrand Company, Inc.; New York.

Thomas Valone; Classical Theory of the Faraday Disk Dynamo; The Homopolar Handbook: A Definitive Guide to Faraday Disk and N–Machine Technologies–Second Edition; Oct., 1998; p. 6–7 and p. 11–12 and title page and copyright page; Integrity Research Institute; Washington D.C.

Archer E. Knowlton; Standard Handbook for Electrical Engineers–Eighth Edition, Second Impression; 1949; p. 840–841 and title page; McGraw–Hill Book Company, Inc.; New York.

Thomas P. Sheahen and Howard E. Jordan and Rich F. Schiferl and Alan M. Wolsky; Introduction to High–Temperature Superconductivity; 1994; p. 203–217 and p. 317–322 and p. 449–453 and title page and copyright page; Plenum Press; New York.

J. B. Ketterson and S. N. Song; Superconductivity; 1999; p. 65–68 and title page and copyright page; Cambridge University Press; Cambridge, UK.

*Primary Examiner*—Karl Tamai
(74) *Attorney, Agent, or Firm*—E. Eugene Thigpen

(57) ABSTRACT

In a preferred embodiment, the invention comprises an apparatus for generating electrical power which utilizes an electrically superconductive coil immersed in a cryogenic fluid for generating a magnetic field within a region surrounding the superconductive coil when an electrical current circulates in the superconductive coil. The apparatus further includes a prime mover and a conduit which conducts a flow of gas resulting from evaporation of a cryogenic fluid to the prime mover to induce rotational motion in the prime mover. An electrical conductor is rotatably mounted within the region surrounding the superconductive coil in which the magnetic field is generated. The electrical conductor is operatively connected to the prime mover so that rotational movement of the prime mover is transferred to the electrical conductor to generate an electrical output current.

22 Claims, 8 Drawing Sheets

U.S. PATENT DOCUMENTS

| | | |
|---|---|---|
| 4,385,246 A | 5/1983 | Schur et al. |
| 4,577,126 A | 3/1986 | Mailfert |
| 4,740,711 A * | 4/1988 | Sato et al. .................... 249/52 |
| 5,144,179 A | 9/1992 | Hilal et al. |
| 5,350,958 A | 9/1994 | Ohnishi |
| 5,482,919 A * | 1/1996 | Joshi ........................... 310/52 |
| 5,530,309 A | 6/1996 | Weldon |
| 5,548,168 A | 8/1996 | Laskaris et al. |
| 5,587,618 A | 12/1996 | Hathaway |
| 5,672,921 A | 9/1997 | Herd et al. |
| 5,710,531 A | 1/1998 | Abolafia |
| 5,841,211 A | 11/1998 | Boyes |
| 6,051,905 A | 4/2000 | Clark |
| 6,154,109 A | 11/2000 | Gold |
| 6,166,317 A | 12/2000 | Volk, Jr. |
| 6,193,194 B1 | 2/2001 | Minovitch |
| 6,375,412 B1 * | 4/2002 | Dial ............................. 415/90 |

* cited by examiner

Faraday disk $V = sB$

ELECTRICAL POWER GENERATION SYSTEM UTILIZING AN ELECTRICALLY SUPERCONDUCTIVE COIL

BACKGROUND OF THE INVENTION

Typically, in electrical power plants in operation today, the prime mover for the generator is a mechanical turbine. The source of power for the turbine is normally either falling water obtained from lakes formed by damming rivers, or steam, obtained by turning liquid water into a gas (steam) by the addition of heat which may be obtained from the combustion of fossil fuels or nuclear reactions. Use of other sources of electrical energy, such as batteries, fuel cells, solar cells, and wind powered generators, is normally less economical than the use of turbine generators.

The underlying theory and equations which allowed others to build machines to convert other forms of energy into electrical energy were developed by James Maxwell and Michael Faraday. In the conversion of heat energy into electrical energy, the latent energy in fossil fuels is first converted into heat energy through the combustion process. This heat energy is then added to a working fluid (water) to increase its potential energy. This heat energy is then converted into mechanical energy by rotating a turbine, which includes electrically conducting coils, in a magnetic field. The fundamental principle utilized in producing electrical energy is that when an electrical conductor (wire) is moved through a magnetic field, an electrical current will flow through the conductor. By connecting this conductor to an external device the electrical current is made to move through the external device, such as an electrical motor, designed to produce a useful effect, and return to the generator.

Massive distribution systems are now required to transport electricity from the generator to the user. The costs associated with developing electrical power distribution systems are extremely high. Moreover, these distributions systems are fragile and need constant maintenance and repair, and power distribution is constantly threatened by climatic disruptions and sabotage.

There is a long felt need for a system for generating electrical power which is non-polluting. There is also a long felt need for a system for generating electrical power which does not require a massive distribution system of electrically conducting wires.

It should be noted that the description of the invention which follows should not be construed as limiting the invention to the examples and preferred embodiments shown and described. Those skilled in the art to which this invention pertains will be able to devise variations of this invention within the scope of the appended claims.

SUMMARY OF THE INVENTION

In a preferred embodiment, the invention comprises an apparatus for generating electrical power which utilizes an electrically superconductive coil immersed in a cryogenic fluid for generating a magnetic field within a region surrounding the superconductive coil when an electrical current circulates in the superconductive coil. The apparatus further includes a prime mover and a conduit which conducts a flow of gas resulting from evaporation of a cryogenic fluid to the prime mover to induce rotational motion in the prime mover. An electrical conductor is rotatably mounted within the region surrounding the superconductive coil in which the magnetic field is generated. The electrical conductor is operatively connected to the prime mover so that rotational movement of the prime mover is transferred to the electrical conductor to generate an electrical output current.

In another embodiment, the invention comprises a method for manufacturing a superconductive electrical conductor in which a channel is formed in a mold and a material which is superconductive below a critical temperature is deposited in the mold.

DESCRIPTION OF PREFERRED EMBODIMENT

Figure 1:
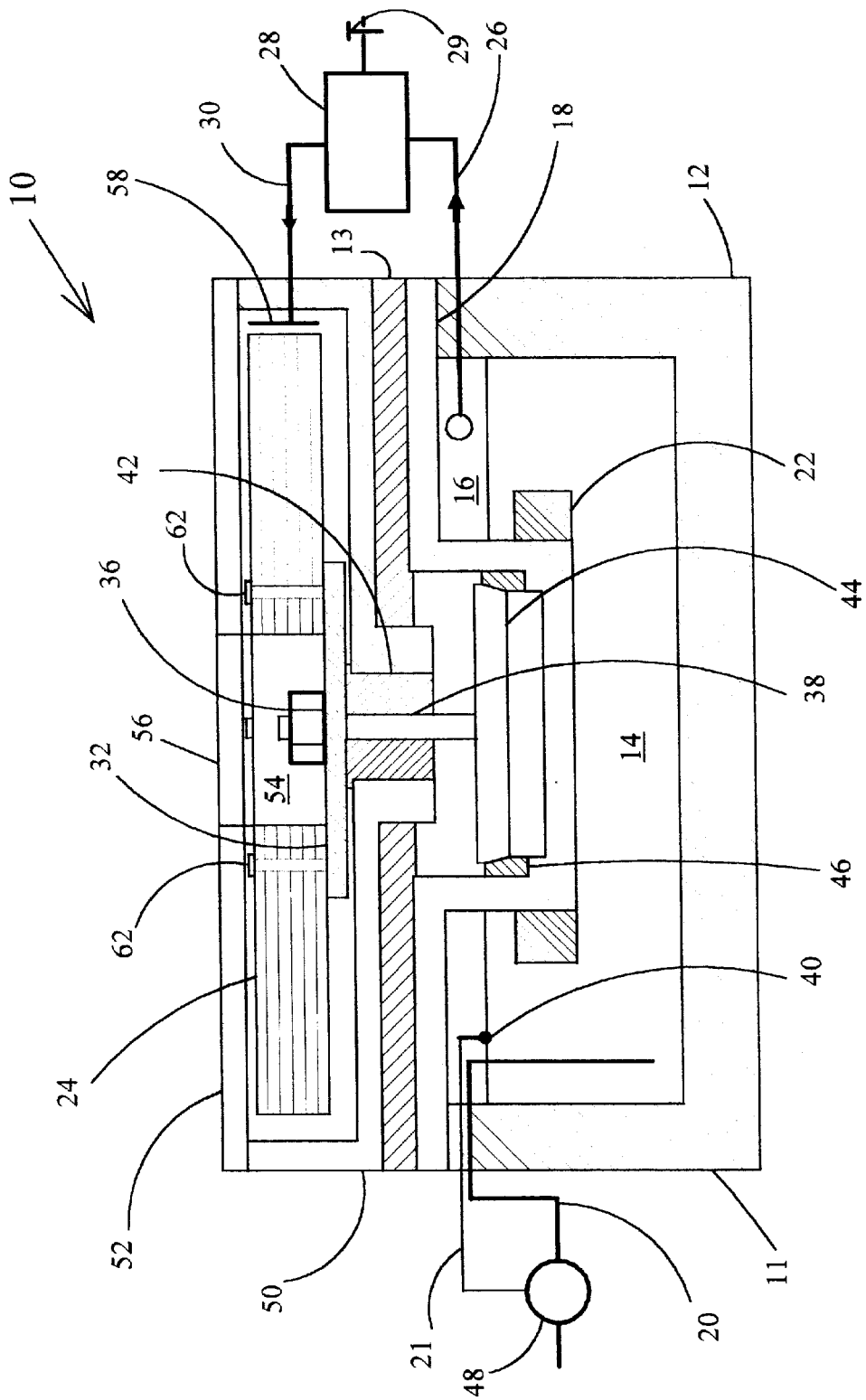
FIG. 1 shows a diagram in partial cross-section of a generator in accordance with a preferred embodiment of the invention

FIG. 1 shows a diagram of an electrical power generator 10 in accordance with a preferred embodiment of the invention. In a preferred embodiment of the invention, power for the prime mover is derived from the conversion of a cryogenic fluid from a liquid to a gas under pressure. The term "cryogenic fluid" is intended to mean a substance which is gaseous at temperatures typically found at the earth's surface, but which may be liquified at lower temperatures. Although nitrogen may be a more practical cryogenic fluid for implementing the invention, those of ordinary skill in the art will understand that other gases which liquify at low temperatures, such as hydrogen or helium, may be utilized in implementing the invention.

Seventy-eight percent of the earth's atmosphere is gaseous nitrogen. Therefore, nitrogen is available at any point on the earth in unlimited amounts. Nitrogen becomes a liquid at about minus 321 degrees Fahrenheit (−321° F.), which is about seventy seven degrees Kelvin (77° K). When heat is added to liquid nitrogen to convert it into a gas, the volume of the nitrogen expands by a factor of about 850/1; that is, a one cubic inch volume of liquid nitrogen becomes about 850 cubic inches of gaseous nitrogen at 77° K. If heat is then added to this one (1) cubic inch volume and the temperature is increased from 77° K to an ambient temperature of 288° K, the pressure of the nitrogen will be about 80 pounds per square inch gage (psig). Accordingly, the thermal energy which is added to the nitrogen may be released to produce a mechanical motion. In accordance with a preferred embodiment of the present invention this produced mechanical motion is utilized to produce electrical power.

In one embodiment of the invention, yttrium barium copper oxide is used as the superconducting material. However, other superconducting material, including but not limited to thallium barium calcium copper oxide and bismuth strontium calcium copper oxide, may be utilized so long as the temperature at which the material becomes superconductive is higher than the temperature at which the cryogenic fluid becomes liquid.

The liquid nitrogen 14 is contained in cryogenic container 12 and superconducting coil 22 is immersed in the liquid nitrogen. As heat is absorbed by the liquid nitrogen, the liquid nitrogen initially boils off as gaseous nitrogen 16, which collects at the top of cryogenic container 12. When the pressure of the gaseous nitrogen increases to a selected level, it will activate pressure regulator 28, which permits gaseous nitrogen to flow, under pressure, through conduit 26 and 30 and nozzles 58, to the prime mover 24.

Figure 2A:
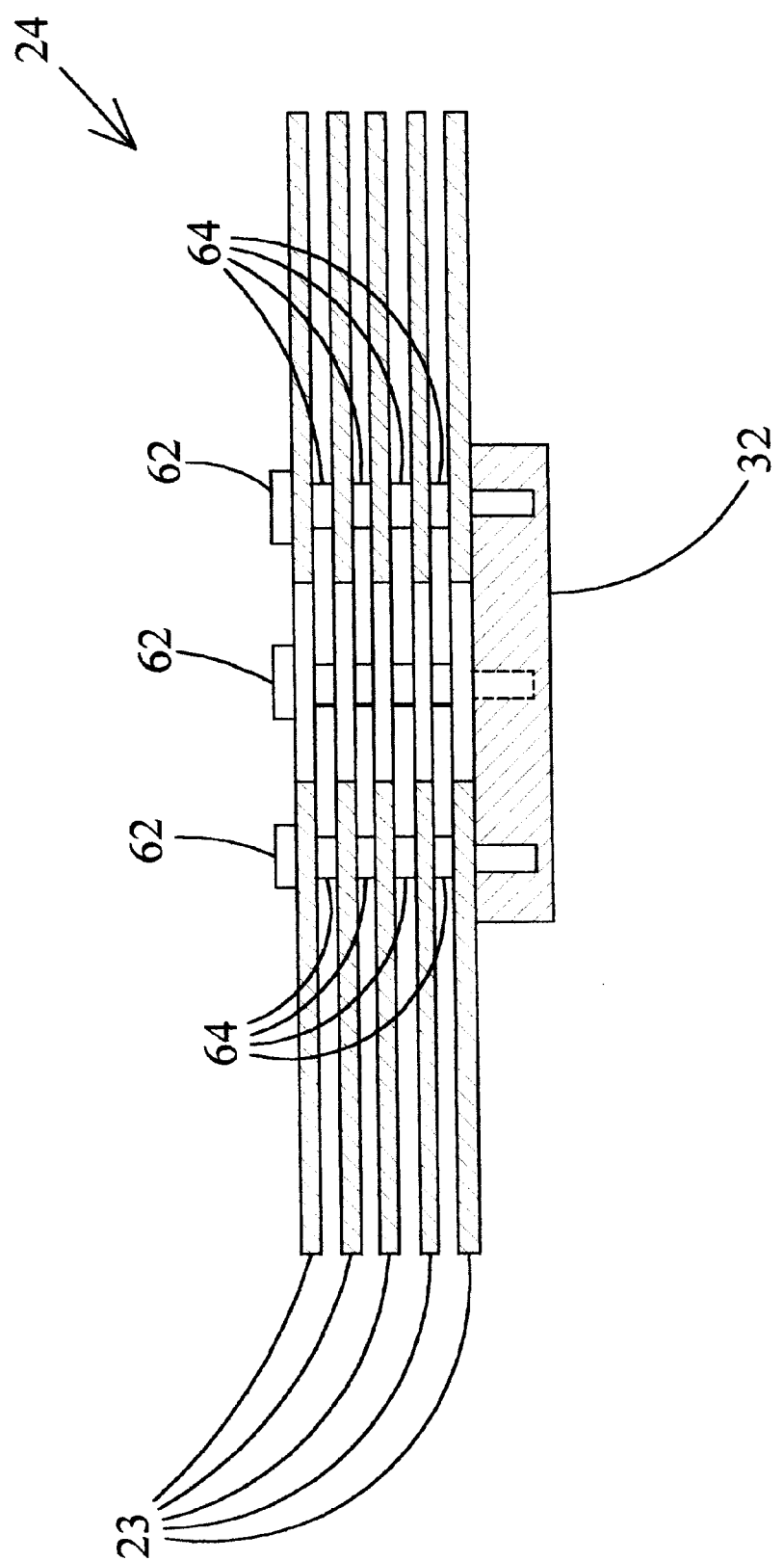
FIG. 2A shows a cross-sectional side view of a prime mover comprising a plurality of spaced-apart disks.
Figure 2B:
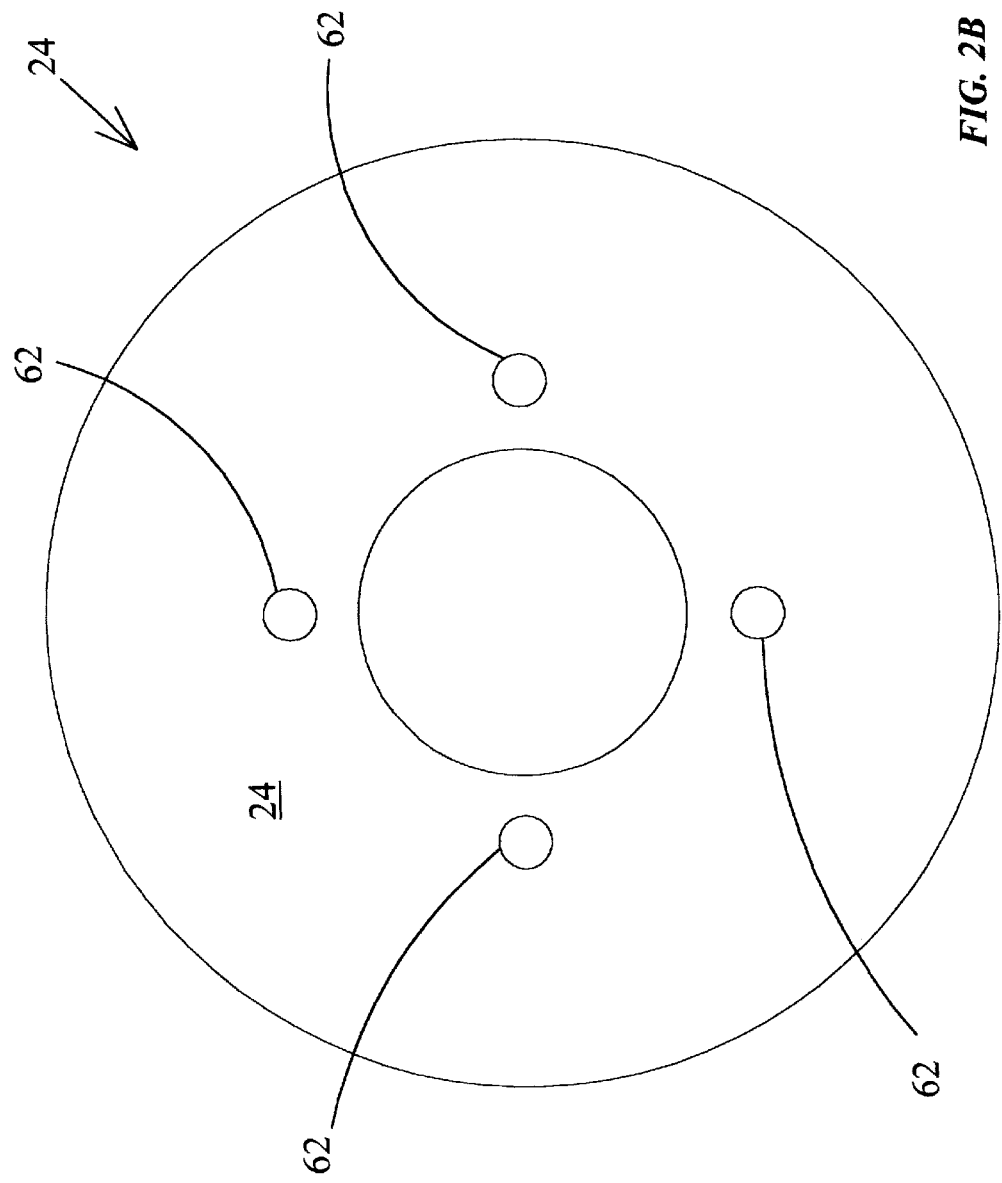
FIG. 2B shows a top view of a prime mover comprising a plurality of spaced-apart disks.

As shown in FIGS. 2A and 2B, in a preferred embodiment, prime mover 24 is a turbine comprising a plurality of disks, mounted closely together in substantially parallel planes. The gaseous nitrogen flows between these disks and induces rotational motion of the prime mover. Prime mover 24 is mounted on disk element 32, which is mechanically coupled to Faraday disk 44 through shaft 38, through which rotational motion of the prime mover 24 is coupled to Faraday disk 44. Faraday disk 44, which may be formed from copper or other highly conductive material, rotates within the magnetic field developed by electrical current circulating in coil 22. As a result of the rotation of the Faraday disk through the magnetic field, a voltage is generated between the center and the outer edge of the Faraday disk. As described further below, current flows from the Faraday disk to a user of electrical energy and back to the Faraday disk through electrical conductors applied to the center and outer edge of the Faraday disk.

Liquid nitrogen, denoted by numeral 14 is contained within cryogenic container 12, which may comprise a conventional Dewar type vessel 11 and cryogenic barrier 18, which forms the top of cryogenic container 12. Dewar type vessel 11 may be a conventional double walled container with a vacuum or a low thermal conductivity material between the walls. Note that FIG. 1 is drawn for the purpose of illustrating the invention and is not intended to be a scale drawing. Cryogenic barrier 18, which forms the top of the cryogenic container 12 would typically be much smaller in relation to vessel 11 than is shown is FIG. 1. Container 12 is configured for maintaining superconductive coil 22 submerged in the liquid nitrogen. The container 12 must be sealed and of sufficient mechanical strength to withstand the pressure build-up of the gaseous nitrogen as the liquid nitrogen boils off.

FIG. 1 shows conduit 20, through which liquid nitrogen may be added to cryogenic container 12 from an external source (not shown) of liquid nitrogen. Conduit 20 may be conventional cryogenic tubing known to those of ordinary skill in the art. Also shown is level sensor 40 and the cryogenic valve 48 that level sensor 40 controls. When level sensor 40 detects that the level of the liquid nitrogen has fallen below a selected level, level sensor 40 opens cryogenic valve 48 to allow additional liquid nitrogen to flow into cryogenic container 12 from the external liquid nitrogen source. This level is selected to keep the superconductive coil 22 submerged in the liquid nitrogen in order to maintain the superconductivity of the coil. Level sensor 40 is operatively connected to cryogenic valve 48, typically through an electrically conducting wire 21.

In a preferred embodiment, power is generated by rotating a Faraday disk 44 in a magnetic field resulting from current flow through coil 22. Power for rotating the Faraday disk is generated by the absorption of heat by the liquid nitrogen, which converts a portion of the liquid nitrogen 14 into gaseous nitrogen. Although cryogenic barrier 18 will have low thermal conductivity, the material forming cryogenic barrier 18 is chosen to conduct a limited amount of heat into the liquid nitrogen chamber for converting the liquid nitrogen to a gas at a controlled rate. Because the nitrogen is confined in cryogenic container 12, pressure will increase in this space as the liquid is converted to a gas. The gaseous nitrogen is held in the cryogenic container until a desired operating pressure is reached. Pressure regulator 28 is set to open at the desired operating pressure so that the gaseous nitrogen flows from conduit 26 to conduit 30 and then through nozzles 58. As the gaseous nitrogen is propelled through the nozzles 58 it reaches a very high velocity (typically 330 meters per second at about 15 psig, or greater at higher pressures). This high velocity gas now flows through the prime mover 24 and into the center space 54 within the prime mover, and then out to the atmosphere through exhaust conduit 56. As discussed below, the gaseous flow through prime mover 24 causes rotational motion of the prime mover. This rotational motion is then transferred through shaft 38 to Faraday disk 44.

As shown in FIG. 1, safety valve 29 may be included in the gaseous nitrogen flow path so that if for any reason the pressure within cryogenic container 12 exceeds a selected maximum pressure, safety valve 29 will open and release gaseous nitrogen into the atmosphere.

The electrical energy output of the generator 10 is proportional to the intensity of the magnetic field produced by superconducting coil 22, which is proportional to the current flow in the coil 22. Because the current flow that can be generated in a superconducting coil is much greater than the current flow that can be generated in a conventional wire, a much more powerful magnetic field can be produced by a superconducting coil than by conventional wire. A particularly advantageous feature of superconducting coils is their ability to sustain an electrical current in the coil without additional electrical input as long as the coil is below the critical temperature of the superconductive material from which the coil is made. Therefore, once the electrical current has started to flow in the coil, the input connections to the coil can be "shorted" together and, provided the temperature of the coil is maintained below its critical (superconducting) temperature, the current will continue to flow in the coil for very long periods of time. Because of the availability of liquid nitrogen, a high temperature superconducting coil is especially useful for producing the magnetic field in the generator portion of the machine.

An advantageous mechanical feature of a preferred embodiment of the invention is that the liquid nitrogen which is utilized for maintaining the magnetic field producing coil at a superconducting temperature may also be utilized for developing the mechanical energy for operating the generator. Although a preferred embodiment of the invention is described in terms of using the evaporating cryogenic fluid from cryogenic container 12 for driving the prime mover 24, those of ordinary skill in the art will understand that the gaseous stream which drives the prime mover may be obtained from a source other than the container in which the cryogenic fluid is stored for maintaining the superconductive coil 22 at a superconducting temperature. For example, the source of the gaseous stream could be another container of evaporating cryogenic fluid.

A conductive coil, which may be made from a high temperature surperconductive material, such as yttrium barium copper oxide (YBCO), is preferably immersed within liquid nitrogen. Accordingly, superconductive coil 22 is shown mounted on a portion of cryogenic barrier 18 which extends downwardly into the cryogenic container 12, so that in normal operation, coil 22 will be immersed in the liquid nitrogen, or other cryogenic fluid. Typically, the upper portion of cryogenic container 12 will contain gaseous nitrogen, which is designated by numeral 16 in FIG. 1. The superconductive coil may be cemented to the cryogenic barrier 18 as shown, but it can be fastened within cryogenic container 12 in any manner that will maintain the coil 22 in a stable position relative to Faraday disk 44. Those of ordinary skill in the art will understand that the mechanism used for holding coil 22 in place must be able to withstand the temperature of the liquid nitrogen, or other cryogenic fluid utilized.

Figure 3B:
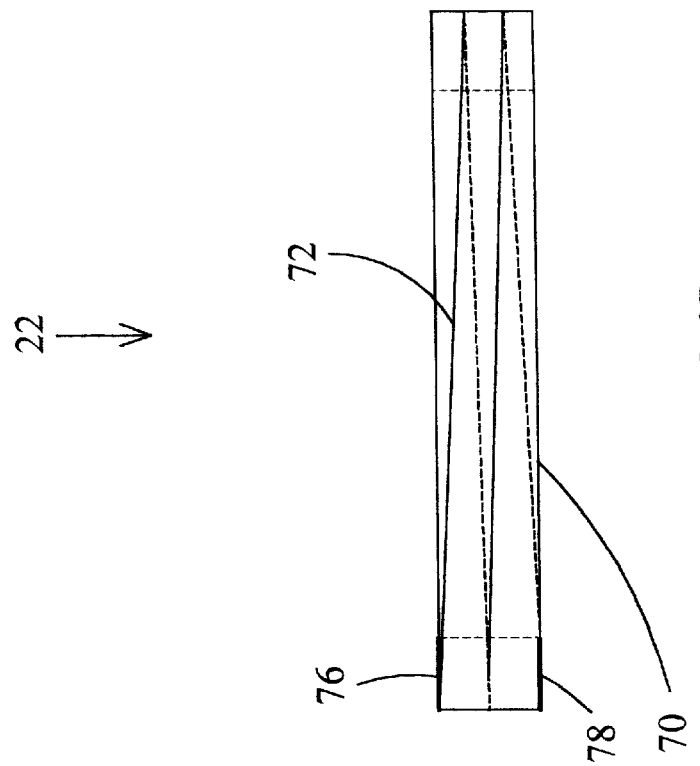
FIG. 3B shows a side view of an implementation of a superconductive coil
Figure 3A:
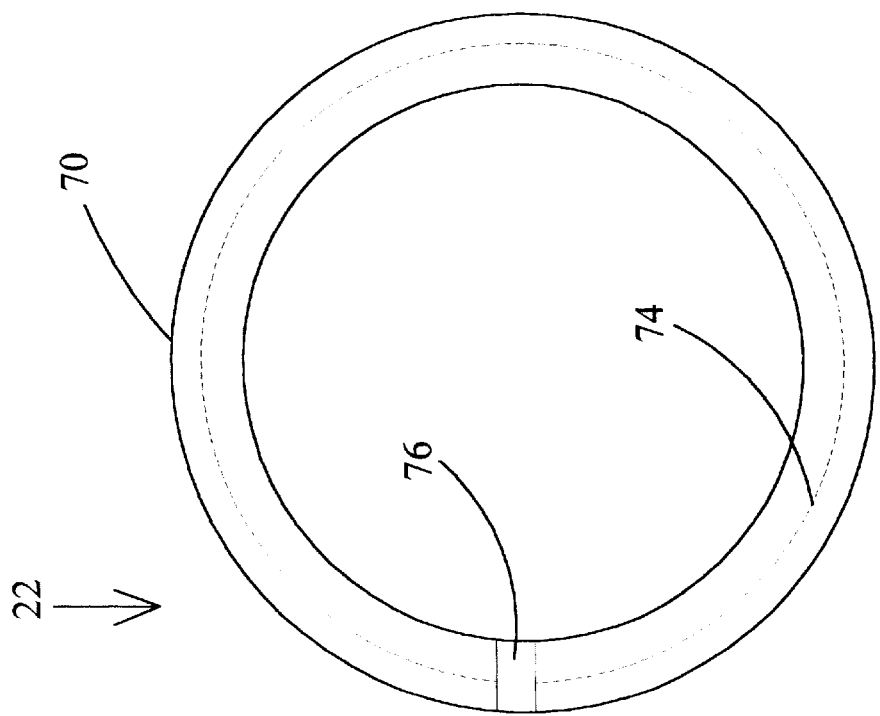
FIG. 3A shows a top view of an implementation of a superconductive coil.
Figure 3C:
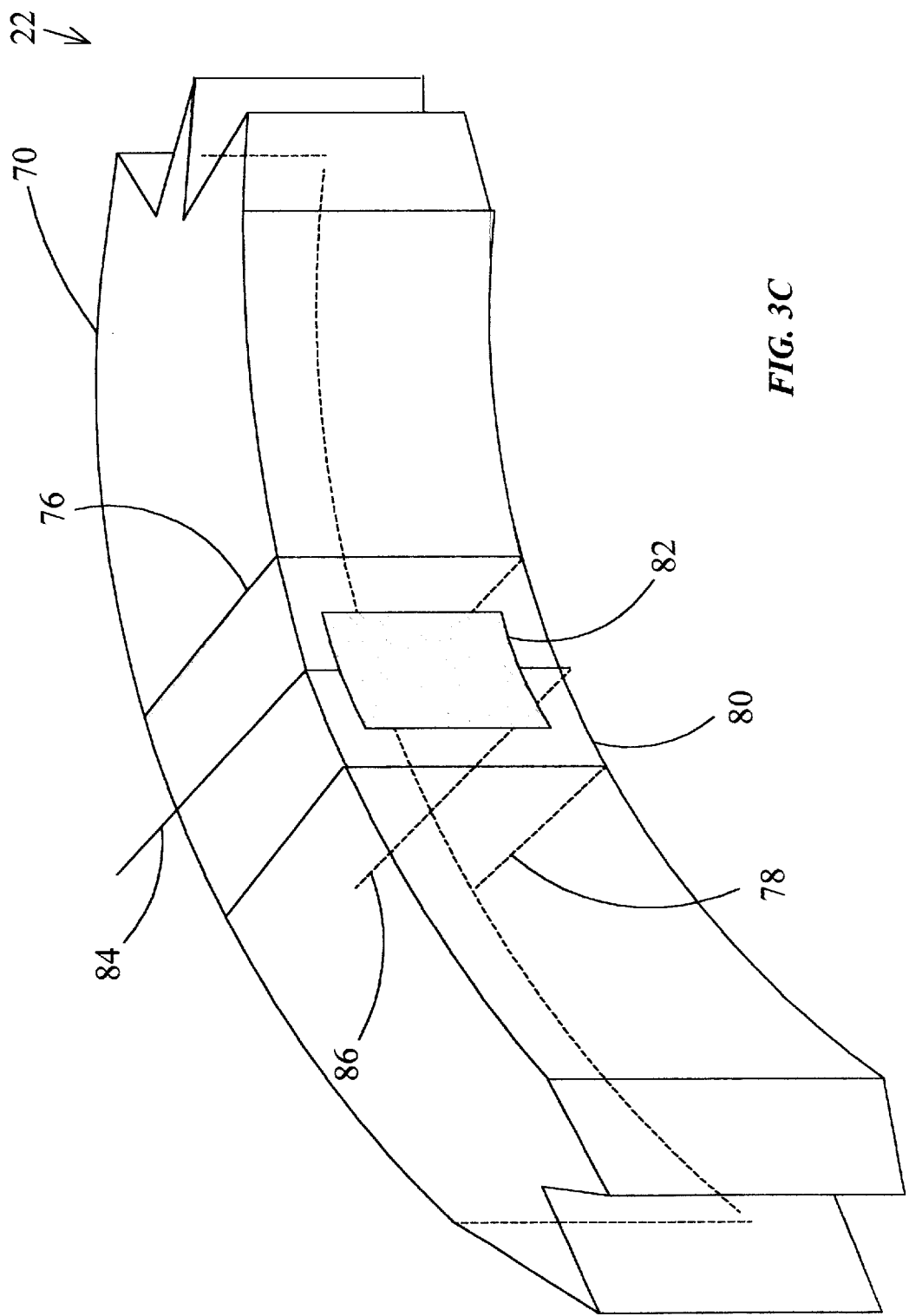
FIG. 3C is a perspective view of a segment of the superconductive coil.

The construction of an implementation of the coil 22 is shown in FIGS. 3A, 3B and 3C. Because of the difficulty in forming a wire from yttrium barium copper oxide (YBCO) and other superconductive material, the coil may be formed within a mold comprising ceramic loop 70, as shown in FIGS. 3A and 3B. Spiral groove 72 may be cut into ceramic form 70, which may extend to a depth location 74 within the ceramic loop. This spiral groove is shown reaching the top surface of ceramic loop 70 at location 76, and reaching the bottom of ceramic loop 70 at location 78. The superconducting coil is formed by filling the spiral groove 72 with the superconductive material. In order to connect the upper end of the spiral loop at location 76 to the lower end of the spiral loop at location 78, a connective groove 80 may be formed in the ceramic form 70 extending from location 76, down the interior side of ceramic form 70, to location 78, as shown in FIG. 3C. By filling this connective groove 80 with the superconductive material, the upper end 76 and the lower end 78 of the spiral loop are joined together to form a superconductive coil.

Also shown in FIG. 3C is a small resistance heater 82 mounted in juxtaposition to connective link 80. As explained below, to initiate operation of the system, a battery (not shown) is connected between terminal 84, which is electrically connected to location 76 and one end of resistance heater 82, and terminal 86, which is electrically connected to location 78 and the other end of resistance heater 82.

Although the method for fabricating a superconductive electrical conductor described with reference to FIGS. 3A, 3B and 3C is described primarily with respect to the fabrication of a coil for implementing the generator described with reference to FIG. 1, the inventive manufacturing method described with reference to FIGS. 3A, 3B and 3C is equally applicable to the fabrication of superconductive electrical conductors for other applications.

As shown more clearly in FIGS. 2A and 2B, in a preferred embodiment, prime mover 24 comprises a plurality of disks 23, which may be made from a high strength aluminum alloy. These disks are affixed together in axial alignment in spaced apart positions, in substantially parallel planes. In one implementation of the invention these disks are affixed together by bolt assemblies 62, which may comprise shoulder bolts. Bolt assemblies 62 may include spacers 64, as shown in FIG. 2A, between each of the disks 23. In a particular implementation of the invention, bolt assemblies 62 also affix the prime mover 24 to support disk 32. FIGS. 2A and 2B show four bolt assemblies 62, however, a different number of bolt assemblies may be utilized. The number of disks 23, the spacing between the disks and the dimensions of the disks may also vary, depending on the required power output, mechanical ruggedness and other design criteria which may be applicable to a particular implementation of the invention.

Rotational movement of prime mover 24 is generated by the flow of the gaseous nitrogen from conduit 30 through one or more high velocity nozzles 58 and through the space between the disks 23 of the prime mover 24. The gaseous stream will typically be projected by the nozzles in a direction which is substantially tangential to the edges of the disks 23. The nozzles may be machined into the wall of the housing structural member 50 within which the disks 23 rotate, rather than separate items connected to the end of conduit 30. The nozzles 58 may substantially increase the velocity of the gaseous nitrogen stream. The disks 23 are closely spaced apart so that the gaseous flow through the spaces between the disks 23 will drag the disks in the direction of the gaseous flow, and since prime mover 24 is mounted, via support disk 32, onto shaft 38, rotational motion of the disks 23 included in the prime mover is generated. Rotational speed of the prime mover assembly increases until the surface speed of the outside edge of the disks 23 reaches almost the same velocity as that of the gaseous jet emanating from the nozzles 58. To increase the power produced by this prime mover assembly, the number of disks 23 and nozzles 58 may be increased, and the volume of nitrogen flow may be increased accordingly. The gas flow across the surface of the disks 23 drags the disk surfaces along the direction of the gas flow. This action takes place in a "layer" of the gas next to the disk surface. It has been called the "boundary" between the gas and the geometrical surface, hence "boundary layer" effect.

Although a preferred embodiment of the invention has been described in terms of a prime mover comprising a plurality of closely spaced, parallel, coaxially mounted disks, those of ordinary skill in the art will recognize that a bladed turbine may also be utilized in implementing the invention, as well as other more conventional prime movers which operate on gas expansion.

The rotational motion of prime mover 24 is transferred to the Faraday disk 44 through shaft 38. Shaft 38 comprises a bolt-like unit, which may be secured to support disk 32 by nut unit 36 in a conventional nut and threaded shaft configuration. Shaft 38 and nut unit 36 may each be made from stainless steel, copper or other material having similar qualities of strength and ruggedness. Nut 36 may be shaped to facilitate flow of gas from the prime mover through exhaust port 56. Shaft 38 may be fixedly connected to Faraday disk 44 by brazing, or by a threaded connection or other means known to those of ordinary skill in the art. Shaft 38 and Faraday disk 44 may also be machined as a unitary structure. Bearing 42 is positioned between shaft 38 and housing structural member 50, to maintain the shaft in alignment and to permit rotational movement of the shaft 38 in sliding engagement with bearing 42. In a particular embodiment bearing 42 may also be configured to extend into the space between support disk 32 and structural member 50, so provide clearance so that support disk 32 can rotate freely. In a preferred embodiment, bearing 42 is made from electrically conductive material in order to conduct electrical current which flows through shaft 38 from the center of the Faraday disk. Bearing 42 may be formed from graphalloy, or other material having similar qualities of low thermal expansion, high electrical conductivity and low surface friction.

Faraday disk 44 is mounted in sliding engagement within bearing 46. In a preferred embodiment, bearing 46 is made from electrically conductive material in order to conduct current into (or from) the outer edge of the Faraday disk. Bearing 46 may be formed from graphalloy, or other material having similar qualities of low thermal expansion, high electrical conductivity and low surface friction. In a preferred embodiment, bearings 42 and 46 provide a means for transmitting electrical energy from the Faraday disk to an external electrical load, as well as a suitable low friction bearing for the shaft 38 and the Faraday disk 44.

Figure 4:
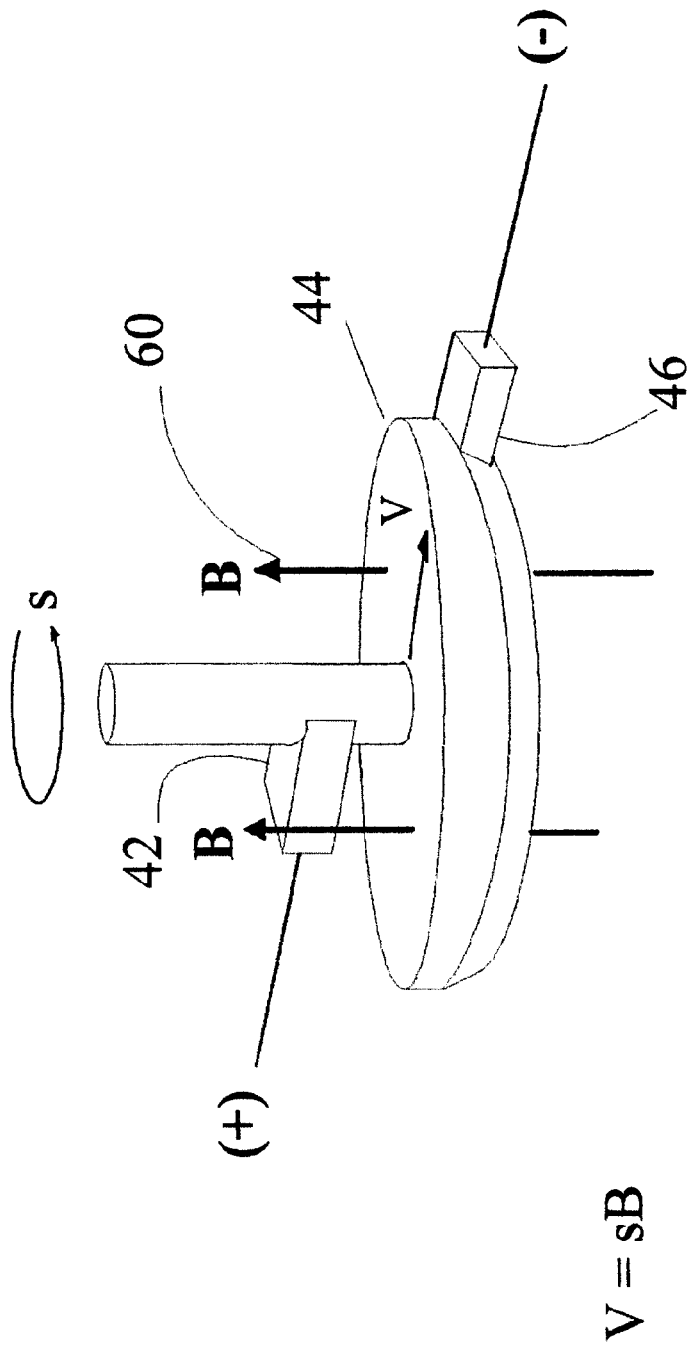
FIG. 4 illustrates in schematic form the generation of a current in a Faraday disk.

As shown schematically in FIG. 4, Faraday disk 44, which may be made from copper or other highly conductive material, rotates through the magnetic flux lines 60 resulting from current flow in coil 22. In accordance with a preferred embodiment of the present invention, an intense magnetic field is produced through the use of the superconducting coil. Induction occurs as a magnetic field is changing strength. In accordance with a preferred embodiment of the invention, the rotating portion of electric power generator 10 moves in relation to the stationary magnetic field and hence produces an electrical current. FIG. 4 illustrates in schematic form the generation of a current in a Faraday disk. The magnetic lines of flux denoted by the letter "B", are shown flowing through the Faraday disk, which is indicated to be rotating in a counterclockwise direction. This rotational movement of the Faraday disk generates an electrical voltage, V, between the center point of the disk, and its outer edge. By positioning a first electrode in contact with the center point of the disk and a second electrode at the outer edge of the disk, a current flow is generated. In the embodiment shown in FIG. 1, bearing 42 is the first electrode and bearing 46 is the second electrode.

It is well known to those of ordinary skill in the art that the power that may be produced by a Faraday disk is governed by the following formulas:

$$V = sB \qquad (\text{Eq. 1})$$

where:
V=voltage developed across the Faraday disk
s=rotational speed of disk in revolutions per second, and
B=magnetic flux in Teslas.

$$I = \frac{V}{r} \qquad (\text{Eq. 2})$$

where:
I=current in amperes
V=voltage developed across the Faraday disk
r=resistance of external load in ohms
and:

$$W = IV \qquad (\text{Eq. 3})$$

where
W=output power in watts
I=current in amperes
V=voltage developed across the Faraday disk.

Although a preferred embodiment of the invention has been described in terms of using a Faraday disk for generation of electrical power, those of ordinary skill in the art will understand that other electrical conductor configurations may be utilized. For example, an electrically conducting coil configuration typical of the electrical conducting coils normally used in electrical power generation system could be rotated in the magnetic field generated by the superconducting coil for generating output power.

Electrical power generator 10 may be powered up as follows. Once the cryogenic container 12 has been filled with liquid nitrogen and level sensor 40 has closed cryogenic valve 48 and stopped the flow of liquid nitrogen into the cryogenic container 12, electrical energy is supplied to coil 22. As stated above in the discussion with respect to FIG. 3C, this electrical energy may be supplied from a battery (not shown) which is connected between terminals 84 and 86. The voltage and current capacity of the battery is selected in accordance with the desired current flow into superconducting coil 22. Typically, the battery will be connected to terminals 84 and 86 by means of electrically conducting wires which will pass through a conduit (not shown) in cryogenic container 12.

As previously stated, resistance heater 82 is connected between terminals 84 and 86, and when a battery is connected across terminals 84 and 86, current will flow through coil 22 and through resistance heater 82. Resistance heater 82 is positioned in juxtaposition to connective link 80, and will maintain connective link 80 at a temperature above its superconductive temperature. Normally, as current begins to flow from the battery through the superconductive coil 22 and back to the battery, the temperature of the coil 22 will be above its critical (i. e., superconductive) temperature. When the coil 22, which is immersed in liquid nitrogen, reaches a temperature below its superconductive temperature, the coil becomes superconductive, and the voltage across terminals 84 and 86 will drop to substantially zero, and the electrical power to the resistance heater is thereby substantially removed. The connective link 80 will then cool to a temperature below its critical temperature and connective link 80 will become superconductive. A superconductive coil has now been formed, with a flow path connecting the beginning of the coil at location 76 to the end of the coil at location 78. The battery may now be disconnected, and the electrical current will continue to flow in coil 22 without any additional current needed from the battery as long as the coil is kept at or below the critical (superconducting) temperature of the material form which the coil is formed As the liquid nitrogen in cryogenic container 12 absorbs heat, the liquid nitrogen is continually boiled off to produce gaseous nitrogen. The process of absorption of heat energy from the environment is a process that depends on the difference in temperature between the environment and the liquid nitrogen and the quality of heat conductive paths between the environment and the liquid nitrogen. Heat flows toward the lowest temperature. Hence, the heat from the earth will by nature flow toward the liquid nitrogen and boil the nitrogen, and then continue to heat the gaseous nitrogen until the gaseous nitrogen reaches the ambient temperature on the earth at the location of the generator. The thermal design of electrical power generator 10 will control the rate at which heat flows to the liquid nitrogen. Accordingly, the thermal capabilities of the generator may be designed to accommodate the heat flow required to provide the power desired from the machine.

Electrical insulating barrier 13 is fabricated from electrically non-conducting material in order to form an electrical barrier between the cryogenic barrier 18 and element 50. Electrical insulating barrier 13 also functions as a structural element to secure structural element 50 and graphalloy bearing 42 in position. Element 50 is formed of an electrically conducting material, such as stainless steel or copper, and is electrically connected through the graphalloy bearing 42 and shaft 38 to the center of Faraday disk 44. Cryogenic barrier 18 is connected through graphalloy bearing 46 to the outer edge of Faraday disk 44. Electrical insulating element 13 provides electrical insulation between cryogenic barrier 18 and element 50. Current developed by the Faraday disk is conveyed from the center of the Faraday disk, through shaft 38, graphalloy bearing 42, structural element 50 and through a first electrical conductor (not shown) to an external electrical power user. The return current path is through a second electrical conductor (not shown), cryogenic barrier 18 and graphalloy bearing 46 to the outer edge of Faraday disk 44. Element 50 also provides a housing for the prime mover. Element 52 closes the housing and provides an exhaust port for the spent gaseous nitrogen.

The upper portions of the machine, comprising cryogenic barrier 18, electrical insulating barrier 13, structural member 50, and exhaust cover 52 may also function as heat exchangers in addition to providing the mechanical structure of the machine. In addition, in one embodiment of the invention sufficient resistivity may be built into cryogenic barrier 18 so that as the power output demand from the generator increases and the current flow through cryogenic barrier 18 increases, the heat generated in cryogenic barrier 18 will increase accordingly, thereby providing a proportionate increase in the rate of conversion of the liquid nitrogen to gaseous nitrogen for driving the prime mover. If it is anticipated that a generator may be required to provide power over wide power output range, additional heat exchangers may be included as a part of the generator.

Figure 5:
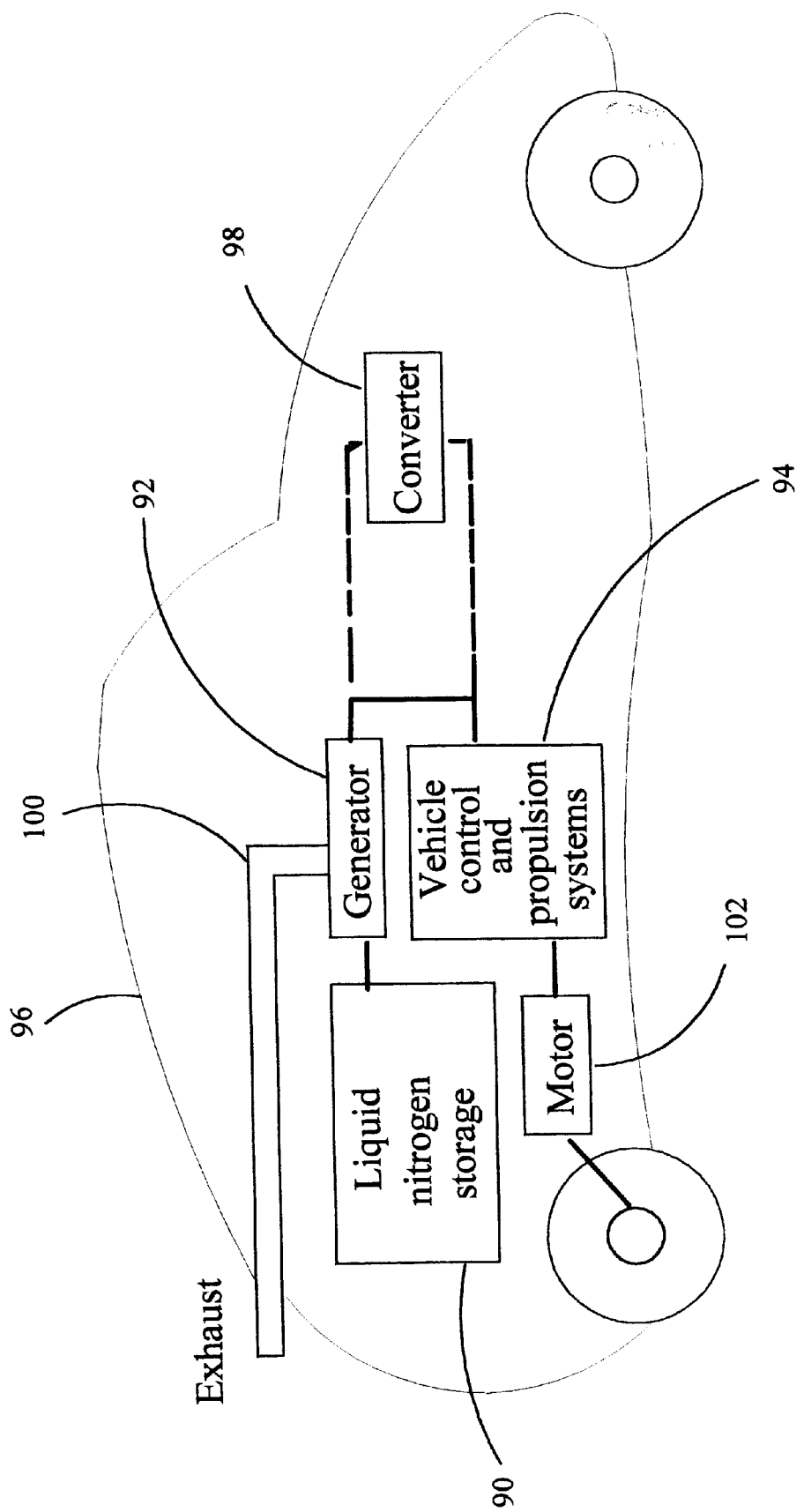
FIG. 5 illustrates the application of the invention to the operation of an automobile.
Figure 6:
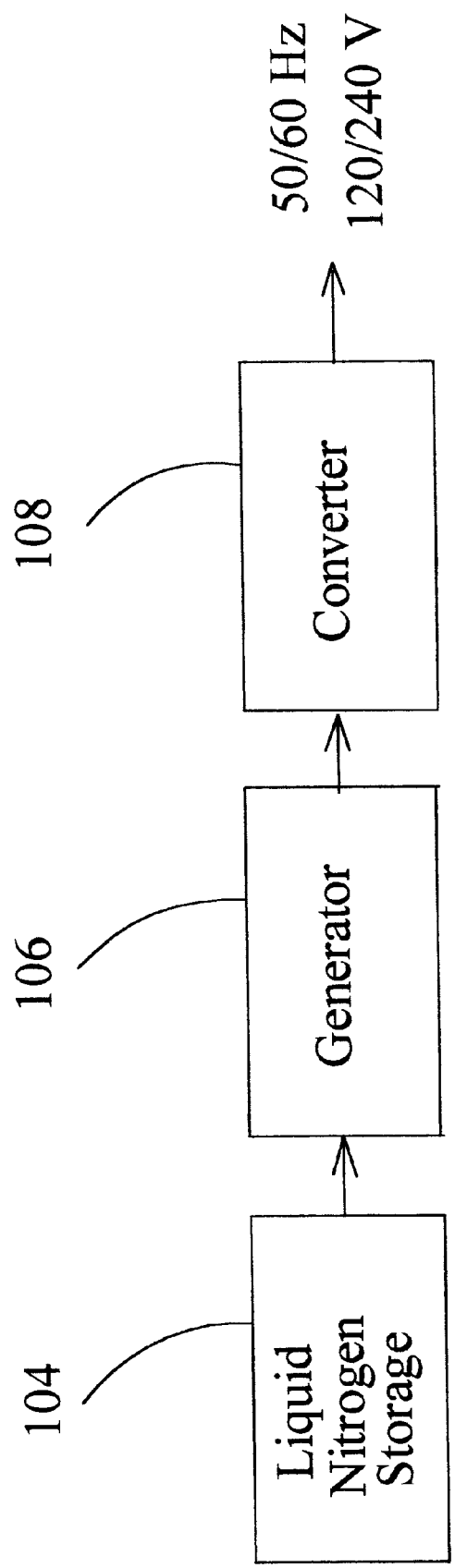
FIG. 6 illustrates the application of the invention for supplying electrical power to a residence.

Uses for the invention may include but are not limited to supplying power for operating an automobile and supplying power to operate the electrical appliances and equipment found in a personal residence. FIG. 5 illustrates the use of the invention for supplying power to an automobile 96. A liquid nitrogen storage unit, designated by numeral 90, supplies liquid nitrogen to the generator 92, which is substantially similar to generator 10 described with reference to FIG. 1. Gaseous liquid nitrogen is exhausted through conduit 100. The output of the generator 92 supplies the power to the vehicle control and propulsion system 94, which may be similar to the control and propulsion system utilized in prior art electrically powered automobiles. Depending on the output voltage level from generator 92, the generator may optionally be applied to a converter 98, to convert the output of the generator to the appropriate voltage level for operating the automobile. Such converters are well known to those of ordinary skill in the art and will not be described in detail herein FIG. 6 illustrates the use of the invention for supplying power to a residence. As shown in FIG. 6, liquid nitrogen is supplied from liquid nitrogen storage unit 104 to the generator 106, whose construction is substantially similar to generator 10 described with reference to FIG. 1. The output of generator 106 is supplied to converter 108, which converts the output from generator 106 to the frequency and voltage required for running a residential electrical system, which typically is 120 or 240 volts, at 50 or 60 Hz. frequency. Such converters are well known to those of ordinary skill in the art and will not be described in detail herein.

It will be appreciated that various modifications, alternatives, variations, and changes may be made without departing from the scope of the invention as defined in the appended claims. It is intended to cover by the appended claims all such modifications involved within the scope of the claims.

What is claimed is:

1. An electrical power generator, comprising:
    a coil formed from material which is electrically superconductive at temperatures below a critical temperature;
    a container surrounding said coil adapted for holding a cryogenic fluid to maintain said coil at a temperature below said critical temperature;
    a prime mover mounted in said power generator so as to be rotatable in response to a gaseous stream;
    a conduit for applying a gaseous stream to said prime mover from a source of pressurized gas resulting from evaporation of a cryogenic fluid, said source of pressurized gas being said container surrounding said coil and said gaseous stream comprising gas resulting from evaporation of said cryogenic fluid; and
    an electrical conductor rotatably mounted in said power generator and operatively connected to said prime mover so that rotational movement of said prime mover is transferred to said electrical conductor, said electrical conductor being mounted in a position with respect to said coil so that an electrical current flow in said coil will produce a magnetic field in the space in which said electrical conductor is rotatable, thereby generating a voltage gradient within said electrical conductor in response to rotational movement of said electrical conductor through said magnetic field.

2. The apparatus of claim 1 wherein said prime mover comprises a plurality of disks coaxially mounted in spaced apart locations in substantially parallel planes.

3. The apparatus of claim 1 wherein said prime mover comprises a bladed turbine.

4. The apparatus of claim 1 wherein said electrical conductor comprises a Faraday disk.

5. The apparatus of claim 1 wherein said electrical conductor is mounted external to said container.

6. The apparatus of claim 4 wherein said Faraday disk is mounted external to said container.

7. The apparatus of claim 1 wherein said cryogenic fluid is liquid nitrogen and said material is yttrium barium copper oxide.

8. An electrical power generator, comprising:
    a coil formed from material which is electrically superconductive at temperatures below a critical temperature;
    a container surrounding said coil adapted for holding a cryogenic fluid to maintain said coil at a temperature below said critical temperature;
    a prime mover mounted in said power generator so as to be rotatable in response to a gaseous stream;
    a conduit between said container and said prime mover for conveying a gaseous stream resulting from evaporation of said cryogenic fluid from said container to said prime mover; and
    a Faraday disk rotatably mounted in said power generator and operatively connected to said prime mover so that rotational movement of said prime mover is transferred to said Faraday disk, said Faraday disk being mounted in a position with respect to said coil so that an electrical current flow in said coil will produce a magnetic field in the space in which said Faraday disk is rotatable, thereby generating a voltage gradient between the center and the outer edge of said Faraday disk in response to rotational movement of said Faraday disk through said magnetic field.

9. The apparatus of claim 8 wherein said prime mover comprises a plurality of disks coaxially mounted in spaced apart locations in substantially parallel planes.

10. The apparatus of claim 8 wherein said prime mover comprises a bladed turbine.

11. The apparatus of claims 8 wherein said Faraday disk is mounted external to said container.

12. An electrical power generator, comprising:
    a coil formed from material which is electrically superconductive at temperatures below a critical temperature;

a container surrounding said coil adapted for holding a cryogenic fluid to maintain said coil at a temperature below said critical temperature;

a prime mover mounted in said power generator so as to be rotatable in response to a gaseous stream;

a conduit between said container and said prime mover for conveying a gaseous stream resulting from evaporation of said cryogenic fluid from said container to said prime mover; and an electrical conductor rotatably mounted in said power generator and operatively connected to said prime mover so that rotational movement of said prime mover is transferred to said electrical conductor, said electrical conductor being mounted in a position with respect to said coil so that an electrical current flow in said coil will produce a magnetic field in the space in which said electrical conductor is rotatable, thereby generating a voltage gradient within said electrical conductor in response to rotational movement of said electrical conductor through said magnetic field.

13. A method for constructing an electrical power generator, comprising:

forming a coil from a material which is electrically superconductive at temperatures below a critical temperature;

enclosing said coil in a container adapted for holding a cryogenic fluid to maintain said coil at a temperature below said critical temperature;

mounting a prime mover in said power generator so as to be rotatable in response to a gaseous stream;

connecting a conduit between said container and said prime mover for conveying a gaseous stream from said container resulting from evaporation of said cryogenic fluid; and rotatably mounting an electrical conductor in said power generator in a position with respect to said coil so that an electrical current flow in said coil will produce a magnetic field in the space in which said electrical conductor is rotatable and operatively connecting said electrical conductor to said prime mover so that rotational movement of said prime mover is transferred to said electrical conductor, thereby generating a voltage gradient within said electrical conductor in response to rotational movement of said electrical conductor through said magnetic field.

14. The method of claim 13 wherein said prime mover comprises a plurality of disks coaxially mounted in spaced apart locations in substantially parallel planes.

15. The method of claim 13 wherein said electrical conductor comprises a Faraday disk.

16. The method of claim 13 wherein said electrical conductor is mounted external to said container.

17. The method of claim 13 wherein said cryogenic fluid is nitrogen and said material is yttrium barium copper oxide.

18. A method for constructing an electrical power generator, comprising:

forming a coil from a material which is electrically superconductive at temperatures below a critical temperature;

enclosing said coil in a container adapted for holding a cryogenic fluid to maintain said coil at a temperature below said critical temperature;

mounting a prime mover in said power generator so as to be rotatable in response to a gaseous stream;

connecting a conduit for applying a gaseous stream to said prime mover from a source of pressurized gas resulting from evaporation of a cryogenic fluid, said source of pressurized gas being said container surrounding said coil and said gaseous stream comprising gas resulting from evaporation of said cryogenic fluid; and rotatably mounting an electrical conductor in said power generator in a position with respect to said coil so that an electrical current flow in said coil will produce a magnetic field in the space in which said electrical conductor is rotatable and operatively connecting said electrical conductor to said prime mover so tint rotational movement of said prime mover is transferred to said electrical conductor, thereby generating a voltage gradient within said electrical conductor in response to rotational movement of said electrical conductor through said magnetic field.

19. A method for generating electrical power, comprising generating a magnetic field by circulating an electrical current in an electrically superconductive coil immersed in a cryogenic fluid, utilizing a flow of gas from a container of cryogenic fluid resulting from evaporation of said cryogenic fluid to generate rotational movement of a prime mover; and operatively connecting said prime mover to an electrical conductor to rotate said electrical conductor in said magnetic field, thereby generating electrical power.

20. An apparatus for generating electrical power, comprising:

an electrically superconductive coil immersed hi a cryogenic fluid, said superconductive coil generating a magnetic field within a region surrounding said superconductive coil when an electrical current circulates in said superconductive coil;

a prime mover;

a conduit which conducts a flow of gas from a container of cryogenic fluid, said flow of gas resulting from evaporation of cryogenic fluid in said container, to said prime mover to induce rotational motion in said prime mover; and an electrical conductor rotatably mounted within said region, and operatively connected to said prime mover so that rotational movement of said prime mover is transferred to said electrical conductor.

21. An electrical power generator, comprising:

a coil formed from material which is electrically superconductive at temperatures below a critical temperature;

a container surrounding said coil adapted for holding a cryogenic fluid to maintain said coil at a temperature below said critical temperature;

a prime mover mounted in said power generator so as to be rotatable in response to a gaseous stream;

a conduit for applying a gaseous stream to said prime mover from a source of pressurized gas resulting from evaporation of a cryogenic fluid wherein said source of pressurized gas is a container for cryogenic fluid other than the container surrounding said coil; and an electrical conductor rotatably mounted in said power generator and operatively connected to said prime mover no that rotational movement of sail prune mover is transferred to said electrical conductor, said electrical conductor being mounted in a position with respect to said coil so that an electrical current flow in said coil will produce a magnetic field in the space in which said electrical conductor is rotatable, thereby generating a voltage gradient within said electrical conductor in response to rotational movement of said electrical conductor through said magnetic field.

22. A method for constructing an electrical power generator, comprising:

forming a coil from a material which is electrically superconductive at temperatures below a critical temperature;

enclosing said coil in a container adapted for holding a cryogenic fluid to maintain said coil at a temperature below said critical temperature;

mounting a prime mover in said power generator so as to be rotatable in response to a gaseous stream;

connecting a conduit for applying a gaseous stream to said prime mover from a source of pressurized gas resulting from evaporation of a cryogenic fluid wherein said source of pressurized gas is a container for cryogenic fluid other than the container in which said coil is enclosed; and rotatably mounting an electrical conductor in said power generator in a position with respect to said coil so that an electrical current flow in said coil will produce a magnetic field in the space in which said electrical conductor is rotatable and operatively connecting said electrical conductor to said prime mover so that rotational movement of said prime mover is transferred to said electrical conductor, thereby generating a voltage gradient within said electrical conductor in response to rotational movement of said electrical conductor through said magnetic field.

* * * * *